(12) United States Patent
Cannon

(10) Patent No.: US 9,011,565 B2
(45) Date of Patent: Apr. 21, 2015

(54) ATTACHABLE AIR FILTER FOR AN AIR VENT REGISTER

(71) Applicant: Joshua Cannon, Greenville, SC (US)

(72) Inventor: Joshua Cannon, Greenville, SC (US)

(*) Notice: Subject to any disclaimer, the term of this patent is extended or adjusted under 35 U.S.C. 154(b) by 22 days.

(21) Appl. No.: 13/922,360

(22) Filed: Jun. 20, 2013

(65) Prior Publication Data

US 2014/0373493 A1    Dec. 25, 2014

(51) Int. Cl.
*B01D 46/00* (2006.01)
*F24F 13/28* (2006.01)

(52) U.S. Cl.
CPC ............ *F24F 13/28* (2013.01); *B01D 46/0005* (2013.01); *Y10S 55/35* (2013.01)

(58) Field of Classification Search
USPC ............. 55/385.1, 385.2, 471, 480, 481, 490, 55/493, 482, 496, 506, DIG. 18, DIG. 31, 55/DIG. 35; 454/195, 245, 309, 187, 181, 454/238, 239
See application file for complete search history.

(56) References Cited

U.S. PATENT DOCUMENTS

| | | | |
|---|---|---|---|
| 1,699,899 A | | 1/1929 | Little |
| 5,141,707 A | | 8/1992 | Brite |
| 5,462,569 A | * | 10/1995 | Benjamin .................... 55/385.6 |
| 5,472,380 A | | 12/1995 | Sarazen, Jr. et al. |
| 5,525,145 A | * | 6/1996 | Hodge .............................. 96/17 |
| 5,597,392 A | | 1/1997 | Hawkins et al. |
| 5,776,218 A | | 7/1998 | Enns |
| 5,792,230 A | | 8/1998 | Moore et al. |
| 5,984,776 A | | 11/1999 | Berger |
| 6,030,427 A | * | 2/2000 | Sorice et al. ..................... 55/480 |
| 6,241,794 B1 | * | 6/2001 | Jadran et al. .................... 55/490 |
| 7,364,602 B2 | * | 4/2008 | Wu et al. .......................... 55/493 |
| 8,460,419 B1 | * | 6/2013 | Hobbs .......................... 55/385.2 |

* cited by examiner

*Primary Examiner* — Duane Smith
*Assistant Examiner* — Minh-Chau Pham
(74) *Attorney, Agent, or Firm* — Southeast IP Group, LLC; Thomas L. Moses

(57) ABSTRACT

An attachable air vent filter assembly for attachment to an air vent register of a HVAC system is disclosed comprising a filter housing having sidewalls and an open top, and the sidewalls being adapted to fit over the vent register. A removable filter carried within the housing having a filter medium for filtering air exiting from the vent register, and at least one air exit opening in the top of the housing for delivering air filtered by the filter medium directly into the interior space.

15 Claims, 3 Drawing Sheets

ATTACHABLE AIR FILTER FOR AN AIR VENT REGISTER

BACKGROUND OF THE INVENTION

The invention relates to a removable, auxiliary air filter for an air heating and/or cooling system that may be used in combination with an existing interior air vent register to provide assurance of clean filtered air, and fragrance if desired.

Currently there are numerous ways to filter air that enters into an air duct system of a living or work space, and separate machines available to reduce and eliminate allergies and harmful dust particles that can be breathed. Devices are also known to fill a home with a fragrance of perfume, sprays, candles, incense, plug-ins, scented ornaments and flowers, as examples. These devices are usually stationary, or do not come directly in contact with a home's air flow. They all have the capability to cause a scent, yet that aroma settles and eventually dies out. That aroma is present but normally the characteristics inhabit only a particular space.

U.S. Pat. No. 5,984,776 shows a register assembly for covering an air duct opening comprising of a faceplate, a base, a damper mechanism and a filter frame assembled with the register. The complete assembly must be used and the filter cannot be used in connection with a preexisting vent register. U.S. Pat. No. 1,699,899 relates to deflectors, and more particularly to the provision of a register having a built-in hinged air filter adapted to present fibrous material in the path of air to be filtered. U.S. Pat. No. 5,597,392 shows a filter assembly adapted to be secured to an air flow register used in heating/cooling systems which includes a filter material and an electric band secured to the filter material for clamping the filter material to the exterior surface of the register skirt below the register. U.S. Pat. No. 5,141,707 shows an air distribution register which includes an odorant substance container positioned in a central area beneath the top surface of the register. U.S. Pat. No. 5,776,218 shows a filter unit for a forced air heating duct having an inside and an outlet end with a register. A filter is shaped to fit inside the duct and is disposed entirely between the duct and the register. U.S. Pat. No. 5,472,380 shows a modular forced-air register including housing with an opening disposed into a hole in the floor of a room, and a louver plate with directional vanes. Air flow is controlled by a slide grille disposed beneath the vanes which carry an integral filter substrate secured to the slide grille. U.S. Pat. No. 5,792,230 shows an air register with a filter element for filtering particulars from the air flowing from the ductwork into a room. The filter element is replaceable as necessary and is sandwiched within a recess in the register face plate by a hinged retaining plate. While the prior art has provided air filters built into air register assemblies that insert into and cover duct openings, they have not provide an air filter which can be attached over a preexisting air register.

SUMMARY OF THE INVENTION

The above objectives are accomplished according to the present invention by providing an improved way of monitoring clean air and providing a pleasant scented home, and a filter that can be universally used in interior of apartments and homes. The filter comes in all the basic sizes needed to accommodate the different types and sizes of air vent registers. The filter includes a frame that is contoured to fit the frame of the vent register and may have a sticky backside adhesive, magnets, screws, or suitable attachment means to attach the filter to the register. The frame has the necessary parts needed to slide a small fragrance filter inside and lock in place. The filter's outer face can be decorative to make a room sleek, elegant or otherwise and practical. The benefit to this filter is having a supplemental source of filtration of air as all of the particles do not get filtered out as they pass through the first HVAC filter. Smaller particles adhere on the insides of the air duct system and need a second filter. These particles are breathed in as they exit and are released to adults, teen-agers, toddlers and babies, etc. This filter will be a second source of defense in an effort to reduce unfiltered air entering the room.

The objectives of the invention are provided by an attachable air vent filter assembly for attachment to an air vent register of a HVAC system wherein the system is of the type having an air duct box, and air vent register box received within the air duct box. A plurality of air openings is disposed on a top of the register for delivering conditioned air into a living or workspace. A HVAC air filter filters air prior to delivery to the air vent openings. The air vent filter assembly comprising a filter housing having sidewalls and housing flange extending from the sidewalls. A top of the housing is open for delivery of conditioned air into the room. The housing sidewalls and flange being adapted to fit over the HVAC vent register. A removal filter is carried within the housing having a filter medium for filtering air exiting from the air vent register, and at least one attachment member may secure the filter housing above the vent register in the direction of airflow.

A removable filter frame is receivable in the frame housing wherein the filter medium is carried by the filter frame. A channel opening is formed in one of the sidewalls of the filter housing wherein the filter frame is receivable and removable through the channel. The filter housing includes a plurality of exit openings, such as slots, over the open top of the housing and the filter media.

DESCRIPTION OF THE DRAWINGS

The invention will be more readily understood from a reading of the following specification and by reference to the accompanying drawings forming a part thereof, wherein an example of the invention is shown and wherein.

DESCRIPTION OF A PREFERRED EMBODIMENT

Figure 1:
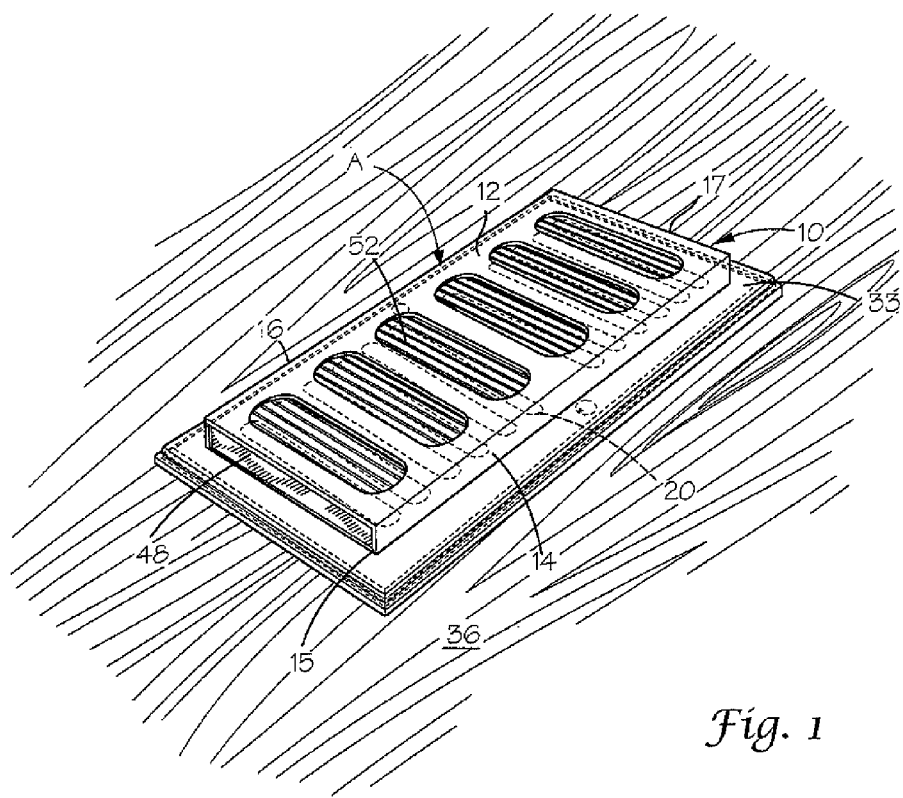
FIG. 1 is a perspective view of a supplemental, attachable filter constructed according to the invention fitted over a conventional air vent register.

Referring now to the drawings, the invention will be described in more detail.

Figure 2:
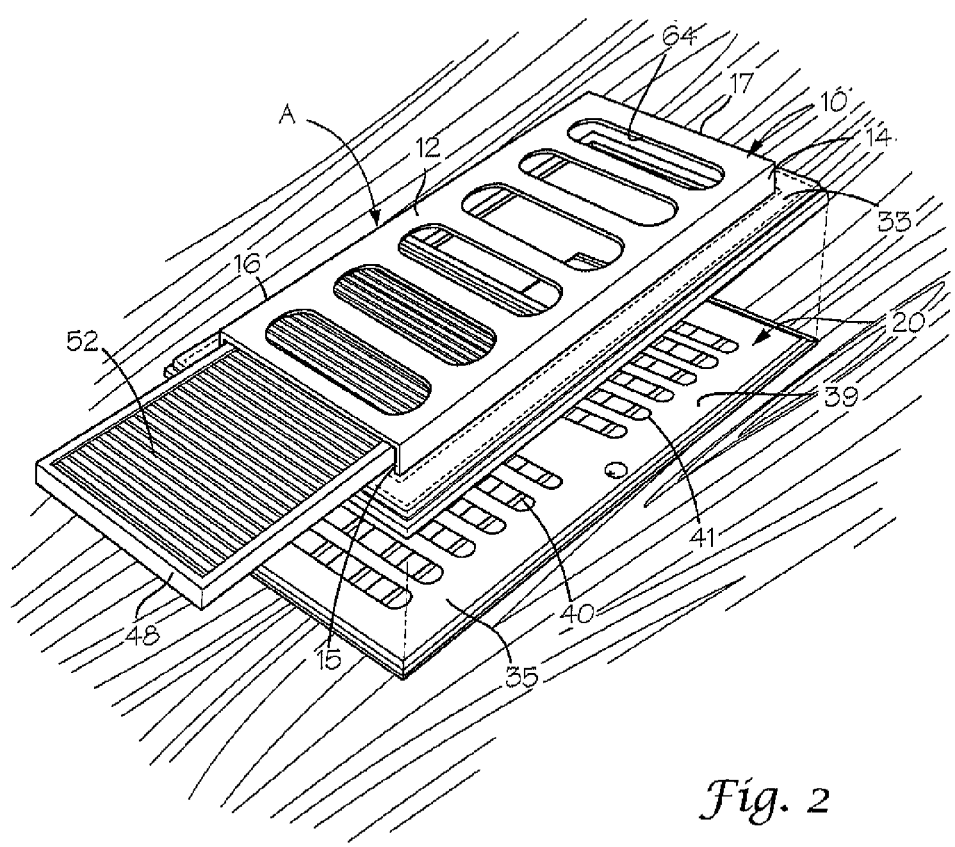
FIG. 2 is a perspective view illustrating a supplemental filter constructed according to the invention being separated from a conventional air vent register.
Figure 3:
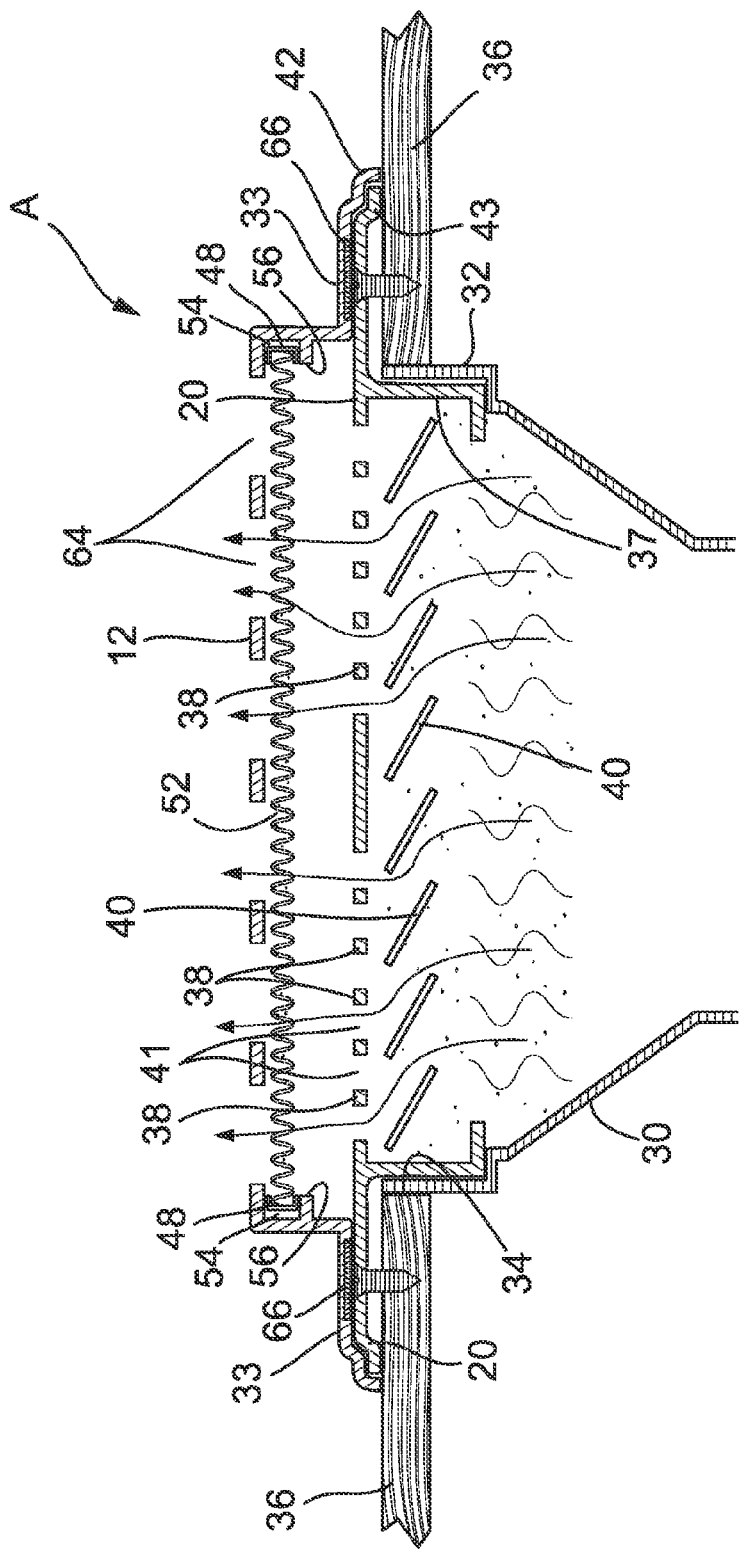
FIG. 3 is a sectional view of FIG. 1.

As can best be seen in FIGS. 1 and 2, a filter assembly, designated generally as A, is shown having a housing 10 with a perforated top surface 12, and contoured sidewalls 14, 15, 16, 17, contoured to fit over register 20 in the floor, wall, or ceiling of an interior space. FIG. 3 illustrates a cross-section of the filter of the present invention attached to a typical air vent floor register 20. An air duct, typically made of sheet metal, illustrated at 30, comes from the central heating and air-conditioning system (not shown) for the delivery of warm or cool air. The air duct includes a box 32 that fits within a vent opening 34 formed in flooring 36. A vent register box 37 includes a sheet metal box that fits within the air duct box and is integral with register plate 39. Register plate 39 includes a top surface 12 having a plurality of air openings defined by vanes 38 and adjustable louvers 40 which open and close the vent register.

Housing 10 of filter assembly A fits on top of vent register 20 and includes a perimeter housing flange 33 contoured to fit with a register flange 35 of register 20 so that the filter assembly blends to appear like the register. Housing flange 33 terminates in a downward contoured lip 42 which mates with a contoured edge 43 of register flange 35. In this manner, the combination appears as a single floor vent. The filter assembly includes a filter frame 48 received in a channel 54 of the filter housing and retained by means of ledges 56 onto which the filter frame 48 slides. A filter media 52 is carried by filter frame 48. A filter cover or top 12 of the filter housing includes a plurality of air exit slots 64 from which the air filtered by the filter media exits into the room.

Preferably, the filter housing is affixed to the floor register floor or wall register by any suitable mechanical or adhesive means. In the illustrated embodiment, a magnet 66 is provided underneath the flange of the frame housing which mates with the top surface of the register flange for securing the same together, yet for allowing the filtered housing to be removed and placed on another vent register.

The invention provides the elimination or reduction in harsh breathable elements and clean air. The filter is placed in a key location that is most sensible when desiring to be most effective, while producing a second source of defense against foreign elements that cause so many to either suffer or constantly purchase items to refresh their living space. Even with a HVAC home filter, air becomes dirty and potentially can allow dirt particles and dust the chance of entering the air duct system. In addition, in some living and work space there is no access to the system and main filter so that one does not know if the filter is clean or not. For example, typically in apartment living, the occupants do not maintain the filter so they do not know if the air is clean or not. The dust that makes it past the filter comes to rest inside the air duct system or enters into the living space. The invention provides an attachable filter set to filter all the things that the main filter does not filter. The room is refreshed while this process takes place. One has the capability of a scent like a quiet evening in a cool desolate desert and the room next to it has a canopy of a vibrant warm rainforest.

Thus, it can be seen that a simple, add-on filter can be had according to the invention that will work universally on apartments, homes, offices, work spaces to assure clean air. The filter housing can be decorative, practical, and easy to use. The filter frame is a simple design that outlines the frame of an air register to appear as the same.

While the preferred embodiment of the invention has been described using specific terms, such description is for illustrative purposed only, and it is to be understood that changes and variations may be made without departing from the spirit or scope of the following claims.

What is claimed is:

1. An attachable air vent filter assembly for attachment to an air vent register of a HVAC system located in an interior space comprising:
    a filter housing having sidewalls and an open top;
    said sidewalls being adapted to fit over the vent register;
    a removal filter carried within said housing having a filter medium for filtering air exiting from said vent register;
    at least one attachment member for securing said filter housing above said vent register in the direction of airflow;
    at least one air exit opening in the top of said housing for delivering air filtered by said filter medium directly into said interior space;
    wherein at least one of said sidewalls includes a perimeter housing flange that fits over a vent register flange to effectively cover said vent register; and
    wherein all said housing flanges include a contoured lip covering an outside edge of said vent register flange.

2. The assembly of claim 1 wherein said vent register flange includes a contoured edge, and said contoured lip of said housing flange having generally the same shape as said contoured edges.

3. The assembly of claim 1 including a removable filter frame receivable in frame housing wherein said filter medium is carried by said filter frame.

4. The assembly of claim 3 wherein said filter frame includes two elongated side members and a longitudinal ledge carried in interior portions of said side members upon which the filter frame slides to be removed and received in said filter housing.

5. The assembly of claim 4 wherein said filter frame includes peripheral top and bottom edges spaced above said longitudinal ledges whereby said filter frame is fitted between said top edges and said longitudinal ledges.

6. The assembly of claim 4 including a channel opening formed in one of said sidewalls of said filter housing, said filter frame being receivable and removable through said channel.

7. The assembly of claim 1 wherein said filter housing includes a plurality of openings over the open top of said housing and said filter media.

8. The assembly of claim 1 including a plurality of attachment members securing said filter housing and register, said attachment members including one of a magnet, screw, a fastener, and an adhesive.

9. An attachable air vent filter assembly for attachment to an air vent register of a HVAC system, said HVAC system being of the type having an air duct box, and air vent register having a register box received within said air duct box, a plurality of air openings disposed on a top of the register for delivering conditioned air into a living or workspace, and a HVAC air filter filtering air prior to delivery to said air vent openings, said air vent filter assembly comprising:
    a filter housing having sidewalls a housing flange extending from said sidewalls, and a top co-extending with said sidewalls;
    said housing sidewalls and flange being adapted to fit over the vent register;
    a removable filter medium carried by said housing for filtering the condition air a second time before exiting into the room; and
    wherein said filter frame includes two elongated side members, and a longitudinal ledge carried by interior portions of said side members upon which the filter frame slides to be removed and received in said filter housing.

10. The assembly of claim 9 wherein said filter frame includes peripheral top and bottom edges spaced above said longitudinal ledges whereby said filter frame is fitted between said top edges and said longitudinal ledges.

11. The assembly of claim 9 including a channel opening formed in one of said sidewalls of said filter housing, said filter frame being receivable and removable through said channel.

12. The assembly of claim 9 wherein said filter housing includes a plurality of openings coextending over the open top of said housing and said filter media.

13. An air vent filter and register assembly comprising: an attachable, supplemental air vent filter assembly attached to an air vent register of a HVAC system, said HVAC system having an air duct box, and air vent register having a register box received within said air duct box, said vent register having a plurality of air openings disposed on a top of the register for delivering conditioned air, and a HVAC air filter filtering air prior to delivery to said air vent register for filtering said condition there, wherein said supplemental air vent filter assembly includes a filter housing having sidewalls and a housing flange extending from said sidewalls about the periphery of the housing, and a top co-extending with said sidewalls having top openings; a register flange formed about the periphery of said vent register, said housing sidewalls and flange being adapted to fit over the vent register and the register flange; a removable filter carried on interior portions of side members upon which the filter frame slides within said housing having a filter medium for filtering said conditioned air a second time prior to exiting into an interior room space.

14. The assembly of claim 13 including a removable filter frame receivable in said housing wherein said filter medium is carried by said filter frame.

15. The assembly of claim 14 including a channel opening formed in filter housing, said filter frame being receivable and removable through said channel.

\* \* \* \* \*